United States Patent
Woerner et al.

(10) Patent No.: US 8,931,516 B2
(45) Date of Patent: Jan. 13, 2015

(54) PILOT-CONTROLLED VALVE HAVING A CERAMIC CONTROL PISTON

(75) Inventors: Ralf Woerner, Tiefenbronn (DE); Siegmund Deja, Freiberg (DE)

(73) Assignee: Knorr-Bremse Systeme fuer Nutzfahrzeuge GmbH, Munich (DE)

(*) Notice: Subject to any disclaimer, the term of this patent is extended or adjusted under 35 U.S.C. 154(b) by 349 days.

(21) Appl. No.: 12/452,892

(22) PCT Filed: Jul. 25, 2008

(86) PCT No.: PCT/EP2008/006128
§ 371 (c)(1),
(2), (4) Date: Feb. 23, 2010

(87) PCT Pub. No.: WO2009/015831
PCT Pub. Date: Feb. 5, 2009

(65) Prior Publication Data
US 2010/0155630 A1    Jun. 24, 2010

(30) Foreign Application Priority Data
Jul. 27, 2007 (DE) .......................... 10 2007 035 775

(51) Int. Cl.
*F16K 11/07* (2006.01)
*F15B 13/04* (2006.01)
*F16K 11/06* (2006.01)
*F16K 31/363* (2006.01)
*F16K 31/04* (2006.01)

(52) U.S. Cl.
CPC ............... *F16K 11/06* (2013.01); *F16K 31/363* (2013.01); *F16K 31/043* (2013.01)
USPC ............. 137/625.66; 137/625.67; 137/625.21

(58) Field of Classification Search
USPC ........ 137/625.21–625.27, 625.6–625.69, 596
See application file for complete search history.

(56) References Cited

U.S. PATENT DOCUMENTS 2,108,182 A * 2/1938 Searle ............................. 303/89
2,443,333 A * 6/1948 Tucker ......................... 91/167 R (Continued)

FOREIGN PATENT DOCUMENTS

DE    1 199 089    9/1959
DE    33 47 135    7/1985

(Continued)

OTHER PUBLICATIONS

European Patent Office, International Preliminary Report on Patentability, Feb. 11, 2010, from International Patent Application No. PCT/EP2008/006128, filed on Jul. 25, 2008.

(Continued)

*Primary Examiner* — John Rivell
*Assistant Examiner* — Daphne M Barry
(74) *Attorney, Agent, or Firm* — Kenyon & Kenyon LLP

(57) ABSTRACT

A pilot-controlled valve having a valve system switches a pressure medium flow between at least one working connection, a supply pressure connection and a ventilation connection, and includes at least one valve member of ceramic material operated rotationally/linearly by pilot control, at least one connecting channel is bringable into flow connection to the working connection, which, based on the valve member's position, produces a flow connection of the working connection to a first flow channel connected to the ventilation connection or to a second flow channel that is connected to the supply pressure connection, at least one section of the first and second flow channels being in at least one static valve body of ceramic material, at least the first flow channel is sealed from the second flow channel by at least one seal that is in a region outside a direct inflow by the pressure medium.

12 Claims, 3 Drawing Sheets

(56) References Cited

U.S. PATENT DOCUMENTS

| | | | |
|---|---|---|---|
| 4,281,684 A * | 8/1981 | Broeg | 137/625.21 |
| 4,325,535 A | 4/1982 | Foster | |
| 4,838,312 A | 6/1989 | Berchem et al. | |
| 4,890,645 A * | 1/1990 | Andersen | 137/625.66 |
| 6,167,909 B1 * | 1/2001 | Davis | 137/624.27 |
| 6,948,525 B2 | 9/2005 | Roether et al. | |
| 2006/0151028 A1 | 7/2006 | Lecea et al. | |

FOREIGN PATENT DOCUMENTS

| | | |
|---|---|---|
| DE | 35 39 316 | 5/1987 |
| DE | 37 31 754 | 4/1989 |
| DE | 101 20 322 | 10/2002 |
| EP | 0 221 231 | 5/1987 |
| EP | 0 514 838 | 11/1992 |
| EP | 1 450 084 | 8/2004 |
| FR | 1 233 819 | 10/1960 |
| FR | 2 407 410 | 5/1979 |
| GB | 2 152 196 | 7/1985 |
| WO | 00/45073 | 8/2000 |

OTHER PUBLICATIONS

European Patent Office, Translation of International Preliminary Report on Patentability, Mar. 4, 2010, from International Patent Application No. PCT/EP2008/006128, filed on Jul. 25, 2008.

* cited by examiner

PILOT-CONTROLLED VALVE HAVING A CERAMIC CONTROL PISTON

FIELD OF THE INVENTION

The present invention relates to a pilot-controlled valve, having a valve configuration which switches a pressure medium flow between at least one working connection, a supply pressure connection as well as a ventilation connection.

BACKGROUND INFORMATION

A pilot-controlled valve is discussed in DE 101 20 322 C1, and relates to a pressure-regulating valve of a compressed air braking system of a motor vehicle, for the purpose of regulating a brake pressure corresponding to a braking pressure setpoint value. The regulating valve has a control piston that is accommodated within a valve housing, which is able to be operated linearly via a control chamber. Opposite the control chamber, the control piston borders on a working chamber. From the working chamber, a coaxial hollow pin is developed on the control piston which is used for the operation of a valve seat system. The valve seat system includes a double seat valve, a valve member actuated by the control piston being flexibly prestressed by spring arrangement against an outer valve seat.

By contrast, the hollow pin connected to the control piston forms an inner valve seat, which is stressed by the pressure in the control chamber. The two valve seats interact with a pot-like sealing sleeve, whose sealing surface comes into contact at both valve seats in a closed switching position of the controlling valve. The sealing sleeve is made up of an elastomer having a reinforcement lining that is vulcanized in. However, after some time, such an elastomeric seal demonstrates subsiding phenomena, so that the sealing effect decreases. Furthermore, such an elastomeric seal is sensitive to pressure media that are contaminated by particles. This disadvantage is of greater consequence if, as is the case here, the valve has to cope with large flow volumes, and the sealing sleeve is situated directly in the flow region of the pressure medium, because then the exposure to particles of the sealing sleeve gives rise to particularly great erosive wear.

SUMMARY OF THE INVENTION

The present invention is therefore based on the object of further developing a valve that is able to have pilot control, of the type mentioned at the outset, in such a way that it has great sealing behavior over a long time period, and at the same time is simple and cost-effective to produce.

According to the present invention, this object is attained by the features set forth herein.

The present invention is based on the following:
a) the valve system includes at least one valve member made of ceramic material that is operated rotationally or linearly by pilot control,
b) In the valve member at least one connecting channel is developed which is able to be brought into flow connection with the working connection, which, as a function of the position of the valve member, produces a flow connection of the working connection to the first flow channel that is in connection with the ventilation connection, or to the second flow channel that is in connection with the pressure feed connection, at least one section of the first flow channel and of the second flow channel being developed in at least one static valve body made of ceramic material,
c) at least the first flow channel is sealed from the second flow channel by at least one seal situated in a region outside a direct inflow by the pressure medium.

The advantage of using a valve member and a static valve body made of a ceramic material is that ceramic material is resistant to aggressive media and to being stressed by a flowing pressure medium that is contaminated with particles, which advantageously increases the service life of the valve. The great dimensional accuracy of ceramic materials at fluctuating temperatures also has a positive effect on the sealing behavior of the valve.

In order to achieve great tightness, last but not least, it is important that at least the first flow channel is sealed from the second flow channel by at least one seal situated in a region outside a direct inflow by the pressure medium. In that case, the stressing of the seal goes down above all when the valve has large volumes of pressure media flowing through it, and the pressure medium is contaminated with particles, which is particularly the case in the use of compressed air brake systems of vehicles.

Advantageous developments and improvements of the present invention described herein are rendered possible by the further measures specified herein.

It may be especially preferred if the at least one seal is elastically prestressed in a direction that improves the sealing effect. The requirement that the seal be situated in a region outside a direct inflow by the pressure medium may be realized, for instance, in that the at least one seal is situated at a radial distance from an opening out of the connecting channel or a flow channel. The at least one seal may then be developed, for example, as an O-ring, and may enclose the opening out of the connecting channel or a flow channel at a radial distance.

According to one variant, the valve includes a valve housing that contains a linearly adjustable control piston, which is provided for the linear adjustment via at least one pilot valve, to be able to be acted upon by a pressure medium, and for the rotational and/or linear actuation of the valve system, the linearly adjustable control piston being controlled, for example, by at least one electropneumatically operated magnetic valve.

According to one refinement of this variant, the valve member includes at least one element made of a ceramic material that is operated linearly by the control piston, in which the connecting channel is developed and the static valve body includes at least two elements made of ceramic material, that form a linear guidance for the valve member, between which the valve member is situated.

The one element of the static valve body, in this context, has a third flow channel, for instance, that is connected to the working connection and a fourth flow channel connected to the working connection, and the other element of the static valve body has the first flow channel and the second flow channel, the valve member having two connecting channels in such a way that, in at least one setting of the valve member, no flow connection takes place between the first flow channel or the second flow channel to the third flow channel or the fourth flow channel, but a setting of the valve member exists in which the first flow channel is connected to the third flow channel or to the fourth flow channel, and a setting of the valve member in which the second flow channel is connected to the third flow channel or to the fourth flow channel in flow connection.

The valve member, the one element and the other element may be supported in the housing by a holding valve body that is movably supported in the housing, at least one section of at least one flow channel of the group of the first flow channel, the second flow channel, the third flow channel and the fourth flow channel being developed in the holding valve body.

The holding valve body is developed in several parts, for example, between the housing and at least one part of the holding valve body, a spring arrangement being provided in such a way that at least the holding valve body, the one element of the static valve body, the valve member as well as the other element of the static valve body are elastically prestressed against the housing, the prestressing taking place by the spring arrangement in a direction that is transverse to the linear motion of the valve member. Because of this, the abovementioned prestressing of the seal is generated.

According to one additional variant, the valve member includes a rotationally operated element made of a ceramic material, in which the connecting channel is developed and which is rotatable, about an axis of rotation, with respect to the static valve body, rotational positions of the valve member existing, in which the connecting channel is in flow connection with the first flow channel or the second flow channel. This design, similar to a rotary-slide valve, stands out because of its very simple construction.

In this variant, when furthermore the valve member and the static valve body are elastically prestressed against an inner wall of a recess in the housing, in which openings out of at least the first flow channel and the second flow channel are developed, the sealing effect of the seal is advantageously increased by the contact pressure.

According to one refinement of this variant, the valve member is able to be operated in rotational fashion by the linearly adjustable control piston, the transmission arrangement for converting the linear motion of the control piston to a rotational motion of the valve member being provided, and the linear motion of the control piston taking place perpendicular to the axis of rotation of the valve member.

According to one further variant, the valve member is driven rotationally by an electric motor, a transmission arrangement being connected between the electric motor and the valve member.

Last but not least, the valve member may also be driven in rotary fashion by a rotary piston, operated by a pressure medium, which is able to have a pressure medium applied to it via a pilot valve.

Exemplary embodiments of the present invention are depicted in the drawings and described in greater detail in the description below.

DETAILED DESCRIPTION

Figure 1:
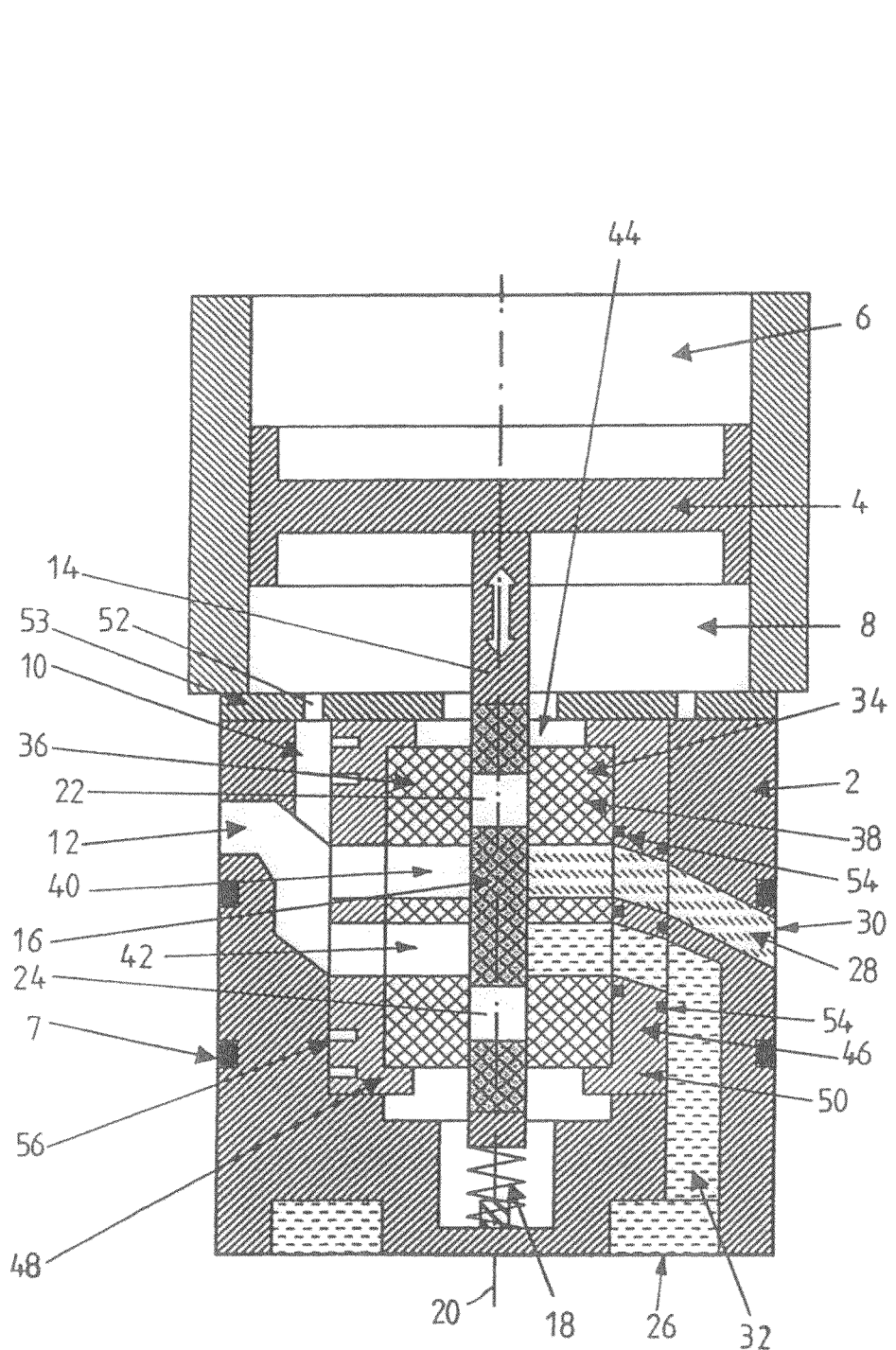
FIG. 1 shows a cross sectional representation of a pilot-controlled valve according to a specific embodiment of the present invention.
Figure 2:
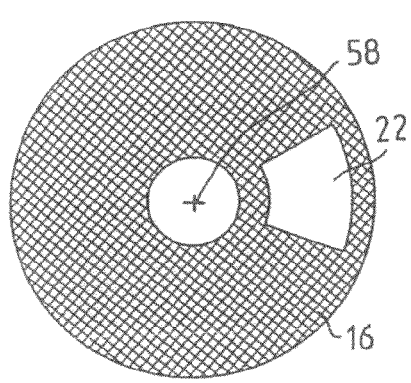
FIG. 2 shows a top view onto a valve member of a pilot-controlled valve according to a further specific embodiment according to the present invention.
Figure 3:
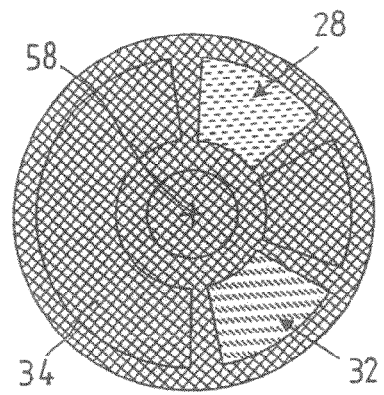
FIG. 3 shows a top view onto a static valve body interacting with the valve member of FIG. 2.

According to one particularly specific embodiment, the pilot-controlled valve is a pressure-regulating valve for an air pressure braking system of a vehicle. According to the specific embodiment of FIG. 1, pressure-regulating valve 1 has an insert 2, accommodated from a housing that is not shown, in whose axial direction a linearly movable control piston 4 is supported, which may be controlled by an electromagnetic valve, not shown, by the pressure increase, pressure maintenance and pressure decrease of compressed air located in a control chamber 6 that is bordered by control piston 4. Insert 2 is developed to be insertable in the housing, and is sealed, which may be by O-rings, from an inner wall of the housing, by seals 7. Since insert 2 represents a static element as opposed to moving parts of valve 1, it will be regarded as belonging to the housing, in the following text.

Beyond control chamber 6, control piston 4 borders on a working chamber 8, which is in connection to a working connection 12 of valve 1, via a connecting channel 10 that is developed in insert 2, at which a compressed-air operated brake actuator is connected, for example.

Control piston 4 has a control piston rod 14, using which it is able to operate a valve member 16, which may be a planar plate of ceramic material, against or with the action of a spring element 18, in a linear manner. Center axis 20 of insert 2 may be in the center plane of the valve member. In valve member 16, two connecting channels 22, 24 are developed, for instance, that are able to be brought into flow connection with working connection 12, as a function of the position that has just been assumed, that is, as a function of the position of valve member 16, a flow connection of working connection 12 is produced to a first flow channel 28, that is in connection with supply pressure connection 30, or to a second flow channel 32 that is in connection with a ventilation connection 26. Supply pressure connection 30 of valve 1 is in connection with a compressed air tank, that is not shown for reasons of scale, and ventilation connection 26 is in connection with the atmosphere. Sections of first flow channel 28 and second flow channel 32, that are situated transversely to center axis 20 and to the plate plane of valve member 16, are developed of ceramic material in at least one static valve body 34.

Static valve body 34 may have at least two guidance elements and valve elements 36, 38 made of ceramic, forming a linear guidance for valve member 16, and valve member 16 is positioned between them. These two valve elements 36, 38 may also be developed in the form of plates. At least the surfaces of valve elements 36, 38 facing each other or facing valve member 16 are planar.

In this connection, the one valve element 36 of static valve body 34 has a third flow channel 40 that is in connection with working connection 12, and a fourth flow channel 42 that is in connection with working connection 12, and the other valve element 38 of static valve body 34 has the transverse sections of first flow channel 28 and of second flow channel 32.

The two connecting channels 22, 24 of valve member 16 and the openings out, on the valve member side, of flow channels 28, 32, 40, 42 are situated in such a way, and have such a diameter, that in at least one setting (the closing setting) of valve member 16 no flow connection comes about between first flow channel 28 or second flow channel 32 to third flow channel 40 or fourth flow channel 42, but there exists a setting of valve member 16 in which first flow channel 28 is in flow connection with third flow channel 40, and an additional setting of valve member 16 exists in which second flow channel 32 is in flow connection with fourth flow channel 42. FIG. 1 shows the closing setting of valve 1, in which none of the flow connections is connected.

Valve member 16, the one valve element 36 and the other valve element 38 may be accommodated in a retaining body 46 that is supported in a blind-hole type of central recess 44 of insert 2, in each case a section of first flow channel 28, second flow channel 32, third flow channel 40 and fourth flow channel 42 being developed in retaining body 46, which, in turn, is continued via lateral opening out into recess 44 of insert 2 up to corresponding connections 12, 26 and 30. Third flow channel 40 and fourth flow channel 42 are guided together within insert 2 to form a common flow channel.

Retaining body 46 is developed to have several parts, for example, and may include two holding side walls 48, 50 which at least partially encompass the one valve element 36 and the other valve element 38 in the direction of central axis 20 of valve 1, but the two holding side walls 48, 50, which are each made of plastic, for example, may not be connected to each other. If the encompassing takes place perpendicular to central axis 20 of valve 1, a prefabricated unit containing the two holding side walls 48, 50, the two valve elements 36, 38 encompassed by them, as well as valve member 16, interposed between them, is able to be inserted from above into correspondingly designed recess 44 of insert 2. The axial securing of the position of this unit in recess 44 is accomplished by putting on a cover 53. Cover 53 has at least one through-hole 52 as a part of connecting channel 14 between working chamber 8 and the common flow channel guided together from third flow channel 40 and fourth flow channel 42.

Seals 54 are situated at a radial distance from the opening out of first flow channel 28 and second flow channel 32 in the side surface pointing to the other valve element 38, as well as the side surface of the other holding side wall 50 pointing toward the inner wall of insert 2, the seals being, for instance, in the form of O-rings, which may be accommodated in grooves that are concentric to flow channels 28, 32, and protrude outwards. These seals 54 are used for sealing first flow channel 28 from second flow channel 32, which are at different pressure levels, namely, at actual pressure and at environmental pressure. They are supposed to prevent pressure media from getting from first flow channel 28, which is at actual pressure, into second flow channel 32, which is at environmental pressure. Seals 54 are situated in a region outside a direct inflow by the pressure medium, which may be because they are situated at a radial distance from the opening out of first flow channel 28 and second flow channel 32, but do not enclose the opening out in a sealing manner.

Seals 54 are elastically prestressed in a direction that increases the sealing effect, for instance, because between the inner side wall of recess 44 of insert 2 and the one holding side wall 48 of retaining body 46, that is at a distance from second flow channel 28 and second flow channel 32, the spring arrangement 56 is provided, in the form of leaf springs, for example. These elastically prestress at least retaining body 46, the one valve element 36, valve member 16 as well as the other valve element 38 with respect to the lateral wall of recess 44 of insert 2. The prestressing by spring arrangement 56 takes place in this case in a direction that is transverse to the linear or the axial motion of valve member 16, for example. This prestressing also has the effect that a valve element 36 is prestressed with respect to valve member 16, and the latter with respect to the other valve element 38, whereby a sealing effect between valve member 16 and valve elements 36, 38 is also generated.

On the part of third flow channel 40 and fourth flow channel 42, no seals need be provided, because these two flow channels 40, 42 guide the working pressure, and therefore do not disturb transverse flows between the two flow channels 40, 42.

Valve member 16 and valve elements 36, 38 of static valve body 34 may be made of the same ceramic material, for instance, of aluminum oxide ($Al_2O_3$). However, every ceramic material and also different ceramic materials may be used for the three components, in particular also oxide-free ceramics.

Against this background, the method of functioning of valve 1 is as follows: When a control pressure is applied to control chamber 6, and a subsequent motion downwards of control piston 4 in FIG. 1, valve member 16 is displaced linearly against the action of spring element 18 in such a way that, for example, upper connecting channel 22 of the two connecting channels is aligned with first flow channel 28, which carries the actual pressure. By contrast, the other connecting channel 24, the lower one in FIG. 1, remains unconnected. Consequently, the pressure arrangement are able to flow in from supply pressure connection 30 through first flow channel 28 and upper connecting channel 22 into third flow channel 40, in order to increase the pressure at working connection 12. At the same time, pressure medium also gets into working chamber 8 via connecting channel 10 on the insertion side, and acts upon control piston 4 against the action of the control pressure acting in control chamber 6. When the pressure in working chamber 8 has reached a certain level, which outdoes the pressure in control chamber 6, control piston 4 in FIG. 1 moves upward again, and the flow cross section between first flow channel 28 and upper connecting channel 22 becomes smaller or is closed, so that the pressure at working connection 12 is held to the regulated level.

During venting of control chamber 6, control piston 4 is transferred to a position that is the upper one in FIG. 1, in which lower connecting channel 24 in FIG. 1 is aligned with second flow channel 32, which is in connection with ventilation connection 26. Pressure medium thereby gets from working connection 12 and from working chamber 8 into the environment via venting connection 26, in order to lower the pressure at working connection 12. Thus, the braking pressure in the brake actuator is influenced by an alternating motion of control piston 4.

According to additional variants shown in FIGS. 2 through 6, the parts that are the same and act the same as in the preceding example are denoted by the same reference symbols. By contrast to this, valve member 16 is a rotationally operated circular plate made of ceramic material, in which connecting channel 22 is developed having, for instance, a circular sector-shaped cross section, and which is coaxially rotatable with respect to static valve body 34, that is also made of ceramic material in the form of a circular plate, about an axis of rotation 58, in which first flow channel 28 and second flow channel 32 are developed, each also having, for example, a cross section that has the shape of a circular sector.

In this connection there exist rotary positions of valve member 16 in which connecting channel 22 is in flow connection with first flow channel 28 or with second flow channel 32, depending on whether an aeration or deaeration is called for. In addition, a closing position without flow connection is also present.

Figure 4:
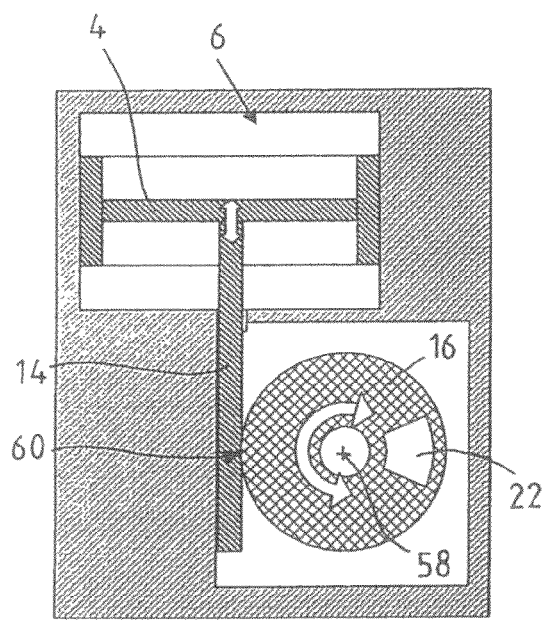
FIG. 4 shows a cross sectional representation of a pilot-controlled valve according to an additional specific embodiment of the present invention.

In the specific embodiment of FIG. 4, valve member 16 is in turn operated rotationally by a linearly adjustable control piston 4, driving arrangement 60 being provided for the conversion of the linear motion of control piston 4 into a rotational motion of valve member 16, and the linear motion of control piston 4 takes place perpendicular to axis of rotation 58 of valve member 16. The drive arrangement 60 may, for instance, also include a rack-and-pinion gear, mutually engaging tooth rows being developed both on control piston rod 14 of control piston 4 and on valve member 16.

According to one additional specific embodiment shown in FIG. 5, valve member 16, again may be developed as a circular disk or a circular plate, is driven in rotary fashion by an electric motor 62, drive arrangement 64 being connected between electric motor 62 and valve member 16, for instance, by having valve member 16 connected in a torsionally fixed manner to a toothed wheel 66 that meshes with a bevel gear 68 of electric motor 62. Valve member 16 is additionally reset into the closing position of valve 1, using a spring 70 against the torque of electric motor 62.

Static valve body 34, in the form of a circular plate-shaped disk made of ceramic material is held torsionally fixed, but axially movable, in a recess 72 in the insert or housing 2. First and second flow channels 28, 32, that are developed in the insert or housing 2, and open out into a bottom of recess 72, are in turn continued coaxially in static valve body 34, and may be sealed from each other on the insert side by concentric seals 54 situated at a radial distance from the orifices and in appropriate grooves in the bottom of recess 72.

In addition, valve member 16 is elastically prestressed with respect to static valve body 34, and the latter is elastically prestressed, in turn, with respect to the floor of recess 72 of insert 2, in a direction parallel to axis of rotation, for instance, by spring arrangement 76, countered in a bearing sleeve 74, which are supported at toothed wheel 66, for example. Because of that, for one thing, static valve body 34 is held in recess 72 of insert 2. For another thing, the sealing effect of seals 54 projecting from the grooves is advantageously enhanced because of the contact pressure between static valve body 34 and the bottom of recess 72 of insert 2. In order to damp the noise of the outflowing compressed air, venting connection 26 may be furnished with a muffler 78.

Figure 6:
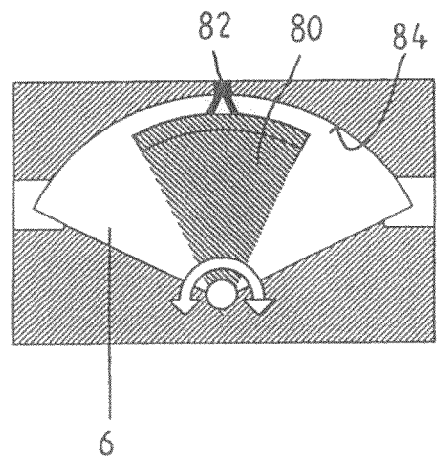
FIG. 6 shows a cross sectional representation of a rotary piston operated by a pressure medium of a pilot-controlled valve according to an additional specific embodiment of the present invention.
Figure 5:
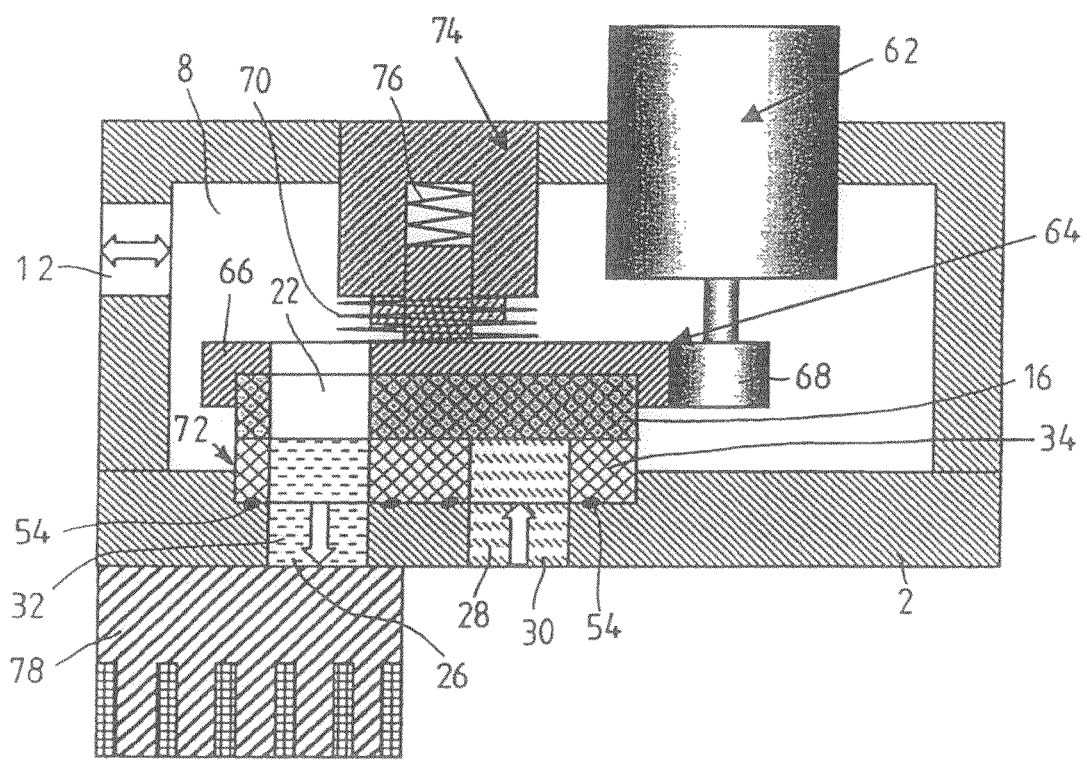
FIG. 5 shows a cross sectional representation of a pilot-controlled valve according to an additional specific embodiment of the present invention.

Last but not least, rotatable valve member 16 may also be driven rotationally by a rotational piston 80 that is operated by pressure arrangement, which is sealed by a seal 82 that is held in insert or housing 2 in a circular coaxial bearing surface 84, as may be inferred from FIG. 6. The control compressed air in control chamber 6 is generated again in this case by a magnetic pilot-controlled valve. Instead of a purely linear motion or a purely rotational motion, it is also conceivable to have a combination of motions of translation and rotation of the valve member.

THE LIST OF REFERENCE NUMERALS IS AS FOLLOWS 1 valve
2 insert
4 control piston
6 control chamber
7 seal
8 working chamber
10 connecting channel
12 working connection
14 control piston rod
16 valve member
18 spring element
20 center axis
22 connecting channel
24 connecting channel
26 ventilation connection
28 first flow channel
30 supply pressure connection
32 second flow connection
34 valve body
36 valve element
38 valve element
40 third flow channel
44 recess
46 retaining body
48 holding side wall
50 holding side wall
52 through-hole
53 cover
54 seals
56 spring arrangement
58 axis of rotation
60 transmission
62 electric motor
64 transmission arrangement
66 gear wheel
68 bevel gear
70 spring
72 recess
74 bearing sleeve
76 spring arrangement
78 muffler
80 rotational piston
82 seal
84 bearing surface

What is claimed is:

1. A pilot-controlled valve, comprising:
a valve system which switches a pressure medium flow between at least one working connection, one supply pressure connection and one ventilation connection;
wherein the valve system includes at least one valve member and valve elements, the valve elements being made of ceramic material, and which is operated linearly by pilot control,
wherein in the valve member, at least one connecting channel is able to be brought into flow connection to the working connection, which, as a function of the position of the valve member, produces a flow connection of the working connection to a first flow channel that is in connection to the ventilation connection, or to a second flow channel that is in connection to the supply pressure connection, at least one section of the first flow channel and of the second flow channel being configured in at least one valve element made of ceramic material,
wherein at least the first flow channel is sealed from the second flow channel by at least one seal that is situated in a region outside a direct inflow by the pressure medium, so that the stressing of the seal goes down when the valve has large volumes of pressure medium flowing through it and the pressure medium is contaminated with particles,
wherein the pilot-controlled valve is a pressure-regulating valve for a compressed air braking system of a vehicle,
wherein the at least one seal is elastically pre-stressed in a direction that improves the sealing effect,
wherein the at least one seal is situated at a radial distance from an orifice of the first or second channel,
wherein the valve member is made of ceramic material that is linearly operated by a control piston, in which the at least one connecting channel is developed and the valve element includes at least two valve elements made of ceramic material, that form a linear guidance for the valve member, between which the valve member is situated,
wherein the other element of the valve element has a third flow channel that is in connection to the working connection and a fourth flow channel that is in connection to the working connection, and the one element of the valve element has the first flow channel and the second flow channel, in the valve member at least two connecting channels being configured so that, in at least one setting of the valve member, no flow connection comes about between the first flow channel or the second flow channel to the working connection, but a setting of the valve member exists in which the first flow channel is in flow connection to the working connection, as well as an additional setting of the valve member, in which the second flow channel is in flow connection to working connection, wherein the valve member, the one valve element and the other valve element are supported by a retaining body in a recess of a valve housing, in the retaining body at least one section of the at least one flow channel is developed of the group including the first flow channel, the second flow channel, the third flow channel and the fourth flow channel, wherein the retaining body is a plurality of parts, and wherein a spring arrangement is provided between the valve housing and at least one part of the retaining body so that the valve member is biased by the spring arrangement, in which orifices of at least one of the first flow channel and the second flow channel are developed, and wherein the prestressing by spring arrangement occurs in a direction parallel to the linear motion of the valve member.

2. The pilot-controlled valve of claim 1, wherein the at least one seal is situated at the radial distance from the orifice of the flow channel.

3. The pilot-controlled valve of claim 2, wherein the prestressing has the effect that the one valve element is prestressed with respect to the valve member, and the latter with respect to the other valve element, so that a sealing effect between the valve member and the one valve element and the other valve element is also generated.

4. The pilot-controlled valve of claim 1, wherein the at least one seal is situated between the valve housing and the valve element.

5. The pilot-controlled valve of claim 4, wherein the prestressing has the effect that the one valve element is prestressed with respect to the valve member, and the latter with respect to the other valve element, so that a sealing effect between the valve member and the one valve element and the other valve element is also generated.

6. The pilot-controlled valve of claim 1, wherein at least one of the valve member and the valve element are planar plates, and at least one of a flow channel and the at least one connecting channel are through-holes that are perpendicular to a plane of the plates.

7. The pilot-controlled valve of claim 6, wherein the prestressing has the effect that the one valve element is prestressed with respect to the valve member, and the latter with respect to the other valve element, so that a sealing effect between the valve member and the one valve element and the other valve element is also generated.

8. The pilot-controlled valve of claim 1, wherein the pilot-controlled valve includes the valve housing that includes a linearly adjustable control piston, which is provided for the linear operation, to be able to be acted upon by a pressure medium via at least one pilot valve.

9. The pilot-controlled valve of claim 8, wherein the linearly adjustable control piston is controlled by at least one electropneumatically operated magnetic valve.

10. The pilot-controlled valve of claim 9, wherein the prestressing has the effect that the one valve element is prestressed with respect to the valve member, and the latter with respect to the other valve element, so that a sealing effect between the valve member and the one valve element and the other valve element is also generated.

11. The pilot-controlled valve of claim 8, wherein the prestressing has the effect that the one valve element is prestressed with respect to the valve member, and the latter with respect to the other valve element, so that a sealing effect between the valve member and the one valve element and the other valve element is also generated.

12. The pilot-controlled valve of claim 1, wherein the prestressing has the effect that the one valve element is prestressed with respect to the valve member, and the latter with respect to the other valve element, so that a sealing effect between the valve member and the one valve element and the other valve element is also generated.

* * * * *